J. Warren.
Oil Still.

N° 97,998. Patented Dec. 14, 1869.

Witnesses:
Chas H Poole
Saml G Marr

Inventor:
John Warren
by Prindle and Dyer
Assc Attys.

J. Warren
Oil Still.
N°. 97,998. Patented Dec. 14, 1869.
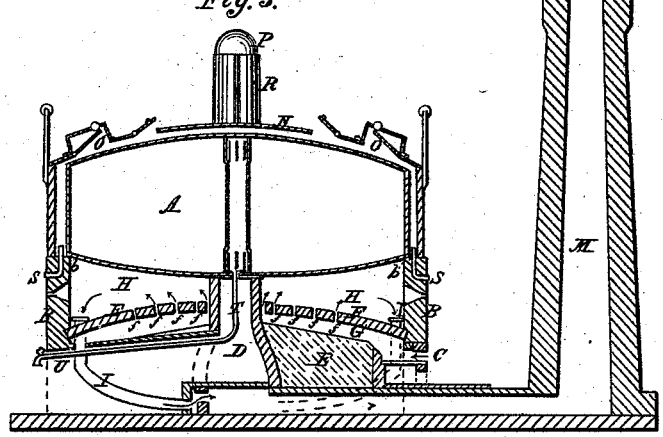
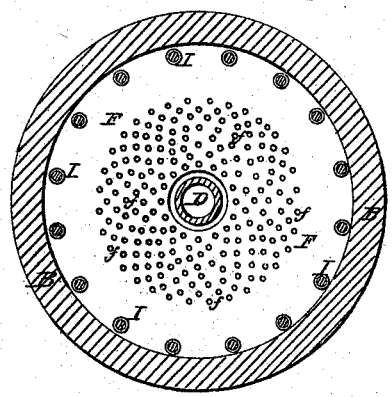
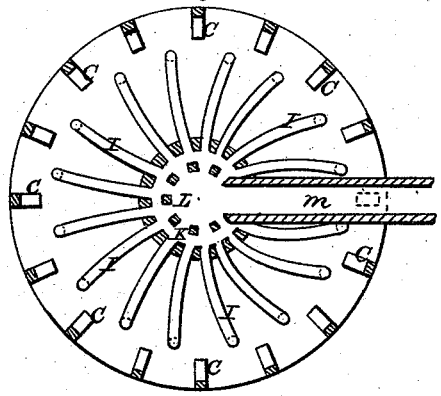
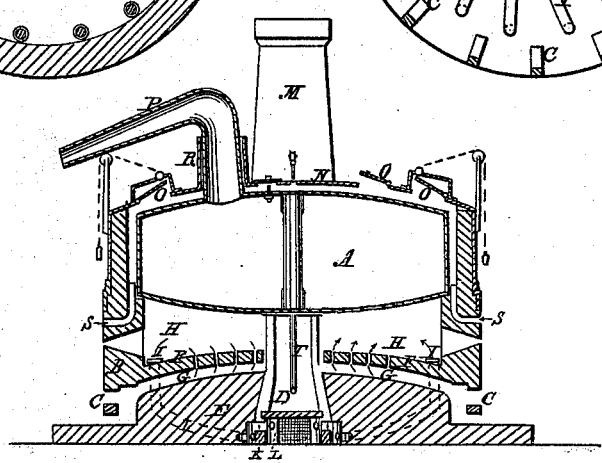
Witnesses:
Chas. H. Poole.
Saml. J. Marr
Inventor:
John Warren,
by Prindle and Dyer,
Ass. Attys.

United States Patent Office.

JOHN WARREN, OF FLUSHING, NEW YORK.

Letters Patent No. 97,998, dated December 14, 1869.

IMPROVEMENT IN STILLS FOR OIL, &c.

The Schedule referred to in these Letters Patent and making part of the same.

*To all whom it may concern:*

Be it known that I, JOHN WARREN, of Flushing, in the county of Queens, and in the State of New York, have invented certain new and useful Improvements in Stills; and do hereby declare the following to be a full, clear, and exact description thereof, reference being had to the accompanying drawing, making a part of this specification, in which—

Figure 3 is a vertical central section, on the line $x\,x$ of fig. 1;

Figure 4 is a horizontal cross-section, on the line $y\,y$ of fig. 2;

Figure 5 is a like section, on the line $z\,z$ of the same figure; and

Figure 6 is a vertical central section, on the lines $z'\,z'$ of figs. 1 and 2.

Letters of like name and kind refer to like parts in each of the figures.

Figure 1:
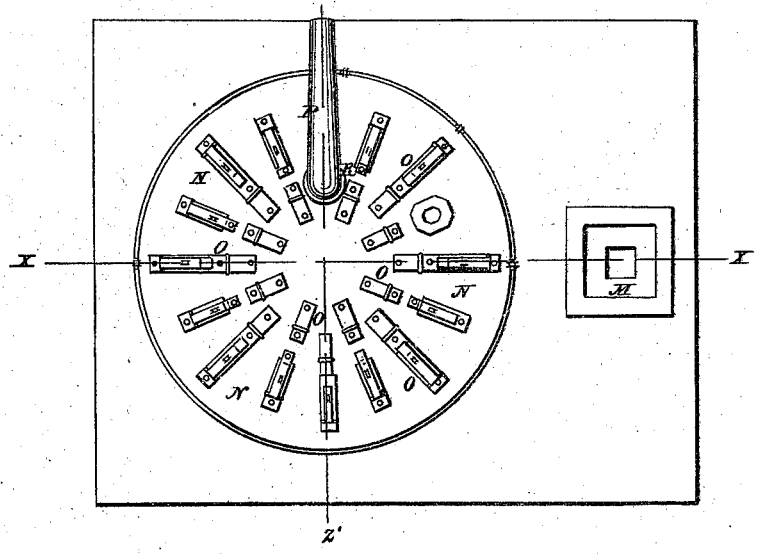
Figure 1 is a plan view of the upper side of the still, as incased.
Figure 2:
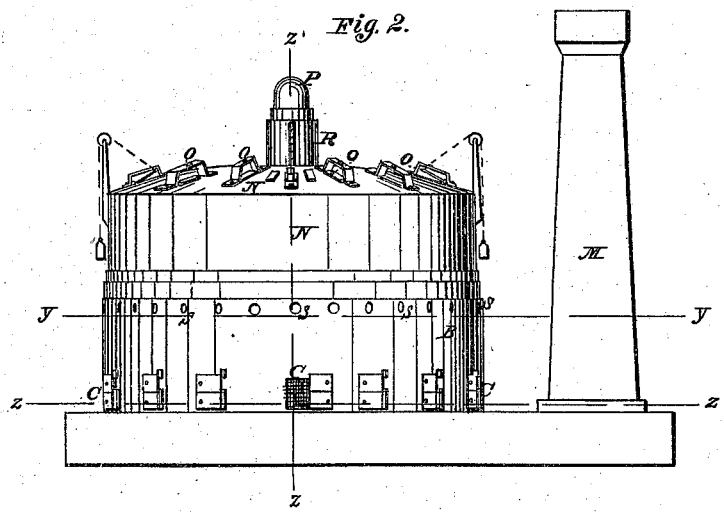
Figure 2 is a side elevation of the same.

My invention has for its object the securing of a more perfect application of heat to the still; the ventilation of the casing around the same; a better construction and arrangement of the smoke-flues; and an improvement in the general arrangement in the casing, and in the manner of setting the still, so as to secure to the same greater freedom for expansion and contraction; and to this end, It consists, principally, in the employment of a perforated convex arch over all of the fires, for the purpose of distributing the heated gases more evenly beneath the still bottom, and thereby securing a more uniform temperature of the same, as is hereinafter set forth.

It further consists in withdrawing the heated products of combustion from the circumference of the combustion-chamber, substantially as and for the purpose hereinafter shown.

It further consists in running all of the smoke-flues from the chamber of combustion into one common chamber within the foundation of the still, at its centre, radially, and from thence through the main flue into the chimney, as is hereinafter specified.

It further consists in the employment of a hollow central pier, so arranged as that the upper portion thereof shall contain the tar-pipe, and the lower portion of said pier shall serve for the central receiving-chamber of the smoke-flues, as is hereinafter shown.

It further consists in the employment of a hinged or removable jacket around the base of the gooseneck, substantially as shown and for the purpose set forth.

It further consists in the arrangement of the ventilating-pipes within the sides of the jacket or casing, and, in combination therewith, in the arrangement of the traps or doors upon and within the upper side of said casing, as is hereinafter specified.

It finally consists in the general construction and arrangement of the heating and ventilating-devices, and of the casing, substantially as shown and for the purpose described.

In the annexed drawing—

A represents the still, resting at its outer lower corner upon an offset, $b$, extending around the interior of the enclosing-wall B; the latter of which also serves to contain the furnaces C, opening into the interior, at regular intervals, around its circumference near the base.

Rising vertically from the central portion of the foundation, is a hollow pier, D, which serves as a central support for the still, and also for other purposes hereinafter specified.

As shown in figs. 3 and 6, the masonry E beneath the still, and within the walls B, rises from near the upper portion of the furnaces C to the hollow pier D, in a convex form, and is enclosed by an arch, F, corresponding in shape with and placed at a short distance above the same, so as to form a flue, G, communicating with, and common to all of said furnaces.

The central portion of the arch F is provided with a series of openings, $f$, through which the heated products of combustion pass upward into the combustion-chamber H, beneath the still, and around the base, by which means the action of the heat upon the bottom of said still is rendered uniform, regardless of the irregularity of the different fires.

I represents a series of pipes or flues placed near the outer side of the chamber H, and from thence extending downward and inward into an annular chamber, K, around the base of the pier D, which chamber communicates with another chamber, L, within the base of said pier, and the latter chamber, in turn, with the chimney M, by means of a large flue, $m$, whereby the draught of the smaller flues and of the furnaces is equalized and rendered uniform.

Secured to, and enclosing the upper portion of the wall B, and also covering the still A, is a casing, N, formed of sheet-metal, and having upon its top side a number of hinged traps or doors, O, arranged radially in two parallel circular lines.

A suitable opening is left in the casing N for the passage of the gooseneck P, the vertical portion of which is increased by means of a cylinder, R, which, being divided longitudinally at its centre, and the sections hinged at one side, may be opened or closed at pleasure, so as to vary the temperature of said gooseneck.

Passing inward through the wall B, a short distance below the bottom of the still, is a series of pipes, S, the inner ends of which curve upward, and enter the space between the sides of said still and said wall, and furnish a means for the admission of cool air for ventilating and cooling-purposes. One half of said pipes pass upward nearly to the top of the still, while the balance extend only through the masonry, and being opened or closed by suitable means, the cool air passing through may be caused to strike against the sides of the still at two points, greatly facilitating the regulation of the temperature of the same.

The tar-pipe T extends downward from the bottom of the still into the pier D, and from thence outward through a passage, U, the outer end of said pipe being so arranged as to pass beyond the masonry, or, if desired, being enclosed within said passage by means of a suitable door.

As thus constructed, my improvements are complete, and possess the following advantages:

First, by means of the perforated arch, and the arrangement of the return-flues, the heated products of combustion are more evenly distributed over the bottom of the still, so as to insure greater durability and efficiency of the same, and also produce a great saving in the time and fuel required to perform a given amount of work.

Second, being unsupported except at its edge and centre, the expansion and contraction of the still-bottom are rendered entirely uniform, as the heated or cool air acts alike upon each portion, so that said bottom is rendered as durable as any portion of the still.

Third, by means of the ventilating-pipes within the wall, and the traps or doors within the top of the casing, the temperature of the still is at all times under complete control, and can be increased or decreased at pleasure; and, after distillation is completed, by opening said traps, ventilating-pipes, and the furnace-doors, the cool air is freely admitted to all portions of the exterior of said still, and causes it to cool off with great rapidity and uniformity.

Fourth, the adjustable casing around the base of the gooseneck enables the temperature of the same to be varied at will, so as to increase or retard distillation and correspondingly vary the separation, which results are obtained with equal certainty and ease, and at a much less expense than by other means employed for this purpose.

Having thus fully set forth the nature and merits of my invention,

What I claim as new, and desire to secure by Letters Patent, is—

Setting a still so as that the outer edge and centre only of its bottom are supported, substantially as and for the purpose specified.

Also, the employment of one common convex perforated arch over all the fires, substantially as shown and for the purpose set forth.

Also, the hollow central pier D, constructed as shown, and for the purpose specified.

Also, withdrawing the heated products of combustion from the circumference of the combustion-chamber, substantially as shown and described.

Also, causing the smoke-flues from the combustion-chamber to centre in one common chamber within the foundation of the still, substantially as shown and for the purpose specified.

Also, the arrangement of the flues I and m, and the chambers K and L, within the foundation of the still, substantially as and for the purpose set forth.

Also, the employment of a hinged or removable jacket around the base of the gooseneck, substantially as shown and for the purpose specified.

Also, the arrangement of the ventilating-pipes S within and through the casing-wall, substantially as shown and for the purpose described.

Also, the arrangement of the doors or traps O upon and within the casing N, substantially as and for the purpose shown.

Also, the combination of the ventilating-pipes S with the traps O, substantially as and for the purpose shown.

Also, the combination of the convex perforated arch F, with the flues I, substantially as shown and described.

Also, the general construction and arrangement of the various parts hereinbefore described, substantially as shown and for the purpose specified.

In testimony that I claim the foregoing, I have hereunto set my hand, this 19th day of October, 1869.

JOHN WARREN.

Witnesses:
IRA H. TUTHILL,
C. WESLEY FURRELL.